Figure 1:
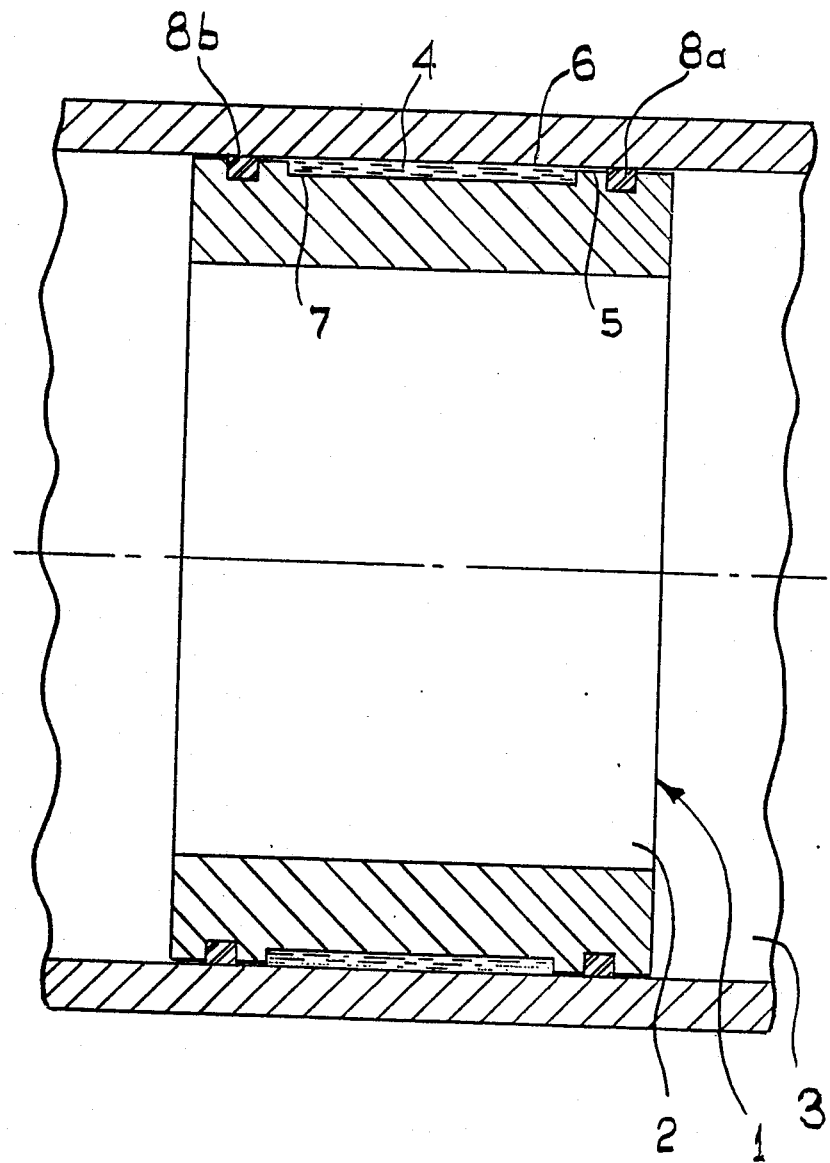

United States Patent [19]

Scales

[11] Patent Number: 4,921,125

[45] Date of Patent: May 1, 1990

[54] SUPPORT ASSEMBLY

[75] Inventor: Christopher Scales, Stroud, England

[73] Assignee: Dowty Fuel Systems Limited, England

[21] Appl. No.: 18,613

[22] Filed: Feb. 25, 1987

[30] Foreign Application Priority Data

Feb. 27, 1986 [GB] United Kingdom ................. 8604841

[51] Int. Cl.$^5$ .................... B65D 25/02; B65D 25/18
[52] U.S. Cl. .................... 220/426; 114/341; 138/148; 138/172; 220/71; 220/85 R; 277/4; 277/73; 285/95; 285/101; 285/104
[58] Field of Search ............... 277/72 FM, 73, 4; 220/426, 72, 71, 85 R; 285/45, 55, 95, 96, 101, 106, 104, 105; 138/140, 147, 97, 93, 98, 148, 153, 172; 405/158, 168; 114/341

[56] References Cited

U.S. PATENT DOCUMENTS

| | | | |
|---|---|---|---|
| 1,266,831 | 5/1918 | Layne | 138/172 |
| 1,429,941 | 9/1922 | Flamm | 114/341 |
| 2,319,543 | 5/1943 | Hall | 277/72 FM X |
| 2,667,348 | 1/1954 | Frye et al. | 277/73 X |
| 2,686,109 | 8/1954 | Moule | 220/426 X |
| 2,783,748 | 3/1957 | Brenneke | 285/55 X |
| 2,814,508 | 11/1957 | Seamark | 285/95 |
| 2,895,747 | 7/1959 | Bland et al. | 285/55 X |
| 2,895,750 | 7/1959 | Gardner et al. | 277/73 X |
| 2,970,719 | 2/1961 | Brady, Jr. | 285/55 X |
| 3,051,511 | 8/1962 | Fawick | 285/106 |
| 3,167,204 | 1/1965 | Rouse, Jr. | 114/341 X |
| 3,291,490 | 12/1966 | Balmer | 285/96 X |
| 3,611,966 | 10/1971 | Hunter | 114/341 |
| 3,768,269 | 10/1973 | Broussard et al. | 405/168 |
| 3,944,263 | 3/1976 | Arnold | 285/106 X |
| 4,059,288 | 11/1977 | Mohr | 285/101 X |
| 4,261,671 | 4/1981 | Langer | 405/158 X |
| 4,346,922 | 8/1982 | Ohtsuga et al. | 138/97 X |
| 4,398,727 | 8/1983 | Rylander | 277/73 X |
| 4,413,655 | 11/1983 | Brown | 138/93 X |
| 4,561,679 | 12/1985 | Choate | 285/106 X |

Primary Examiner—Allan N. Shoap
Attorney, Agent, or Firm—Davis, Bujold & Streck

[57] ABSTRACT

A support assembly (1,11,31) for mounting within a vessel (3) which may be subjected to an inwardly acting pressure differential, comprises a support member (2,12) which is in contact with an internal surface, of the vessel so as to define a recess (4,14). In use the recess is filled with an incompressible fluid, which may be an hydraulic oil. The support member (2,12) may be further provided with an intensifier (19,32) which produces a positive pressure differential between the fluid in the recess (4,14) and the pressure acting on the vessel 3. The effect of this is to induce a tensile loading in the vessel wall in the vicinity of the recess (4,14) and thereby provide support for the vessel.

8 Claims, 3 Drawing Sheets

SUPPORT ASSEMBLY

This invention relates to a support assembly, in particular, a support assembly for use with a vessel which is to be subjected to an inwardly acting pressure differential.

A well known type of support assembly used for this function comprises, providing the vessel with inwardly projecting ribs which extend circumferentially about the vessel. The ribs provided in this type of support assembly are formed integrally with the walls of the vessel or can be seperate members which are welded, or otherwise attached, within the vessel; in either case they are a permanent fixture of the vessel. This means that the effective working space within the vessel is significantly reduced, particularly when the vessel is of small internal diameter, for example oil pipelines, subjected to high hydrostatic pressures.

Alternatively, the vessels are simply manufactured with a wall thickness sufficient to withstand the expected pressure. The major disadvantage with this is that the overall weight and cost of the vessel is drastically increased.

In accordance with the present invention a support assembly comprising a support member for mounting within a hollow vessel and which can contact an inner surface of the vessel is characterised in that a recess is defined between the support member and the inner surface of the vessel, which recess, in use, is filled with a liquid, and means are provided to seal the liquid within the recess.

This support assembly may be used in conjunction with any vessel, especially a generally tubular body, for example an oil pipeline, which, in use, is going to be subjected to an external positive pressure differential. Commonly, any tubular body will be of circular cross section.

The vessel is, preferably, circular in cross section.

In use, the external pressure exerted on the vessel is transmitted to the liquid housed in the recess through the wall or by means of a separate member. The liquid in the recess is therefore at least at a pressure equivalent to that being exerted upon the vessel. The effect of this is to induce a circumferential tensile loading in the vessel wall in the area adjacent the recess. The tendancy of the vessel wall to buckle is therefore resisted.

Further, the tensile loading of the vessel wall means that when the vessel is not of exactly regular shape, for example exactly circular, the wall will tend to be forced into a regular shape by the pressure induced in the recess. The advantages of having a truly regular shape are well known, the major advantage with vessels having a truly regular shape, for example in a circular cross-sectional, is that they are far more able to resist buckling forces than a vessel having even a minor deviation from the regular.

In use, the support assembly may be called upon to resist pressure differentials in excess of 100 bar. It is therefore essential to ensure that the liquid housed in the recess is as incompressable as possible. In practice any incompressable fluid may be used, but preferably liquids and in particular oils are employed. The liquid used is, most preferably, an hydraulic oil.

In a preferred embodiment the support member is an annular ring detachably housed within the vessel. The outside diameter of the ring is approximately the same as the inside diameter of the tubular vessel, to ensure a good sealing contact, between the support member and the vessel.

In order to ensure pressure is maintained within the recess, the support member is preferably provided with two circumferential sealing members, one on each side of the recess, so as to ensure integrity in the sealing contact between the vessel and the support member when the support assembly is in use. The two circumferential sealing members may be simple 'O' ring rubber seals and preferably comprise two rectangular cross sectional sealing bands.

The support member preferably has a groove formed in the surface which, with the inner surface of the vessel defines the recess. In this case the two circumferential sealing members are positioned on either side of the groove, so that the groove substantially defines the recess. In operation it has been found that very small groove depths have been very successful, and depths of 0.15 mm have been advantageously used.

As previously mentioned the support member may be detachably mounted within the vessel, thereby enabling the vessel and the support member to be manufactured from different material. This means the respective parts of the assembly and the vessel can be manufactured from materials specifically suited for performing the job. In the position envisaged the support member may be manufactured from a material specifically designed to resist high tensile loading forces, this is, preferably, a high strength metal or metal alloy e.g. high tensile steel.

Further, in the case where the external enviroment is highly corrosive to high strength metal or metal alloys, the vessel may be made of material specifically designed to resist this type of enviroment with the members made of high strength metal which support the vessel housed in the internal non-corrosive atmosphere.

The performance of the support assembly is improved by increasing the tensile loading brought about in the vessel wall. This may be achieved by increasing the pressure induced in the recess relative to the external pressure being exerted on the vessel. This is, preferably, achieved by ensuring a ratio between the pressure in the recess and the external pressure.

Further, in order to cause the pressure ratio mentioned above, the support assembly preferably also comprises a pressure intensifier. The intensifier will have a low pressure side and a high pressure side, the low pressure side being acted upon by the external pressure whilst the high pressure side is arranged so as to induce a realtively higher pressure in the recess.

The intensifier may be a stepped piston which is movable within a stepped bore. The piston and bore being sealed to ensure integrity of pressure within the system.

The net effect of inducing a higher pressure in the recess, is to increase the tensile load being achieved in the vessel wall in the region of the recess. By increasing this tensile load the area over which the load is being achieved is increased. Therefore, the support of the vessel is improved, and the ability to resist buckling is increased.

Normally any vessel will be provided with a plurality of these support assemblies, each of which could have its own intensifier. Obviously the provision of an intensifier or a number of intensifiers drastically increases the volume, and, therefore, the space occupied by the support or supports. It is possible to link the support members or a number thereof, in a system which is provided with one or more common intensifiers. In oil pipelines it would be possible to create a multiplicity of these systems over the length of the pipeline.

As an alternative to using intensifiers the system or support member may be provided with an internal pressure source e.g. pressure cylinder. This system has all the benefits of the increased tensile loading of a vessel wall, however, the degree of relative tensile loading will be dependent upon the external pressure exerted on the vessel wall.

Also according to the invention there is provided a reinforced vessel having a cylindrical wall which defines a bore and comprising at least one detachable internal support assembly for mounting within the bore, wherein the internal support assembly is in accordance with the invention.

Figure 2:
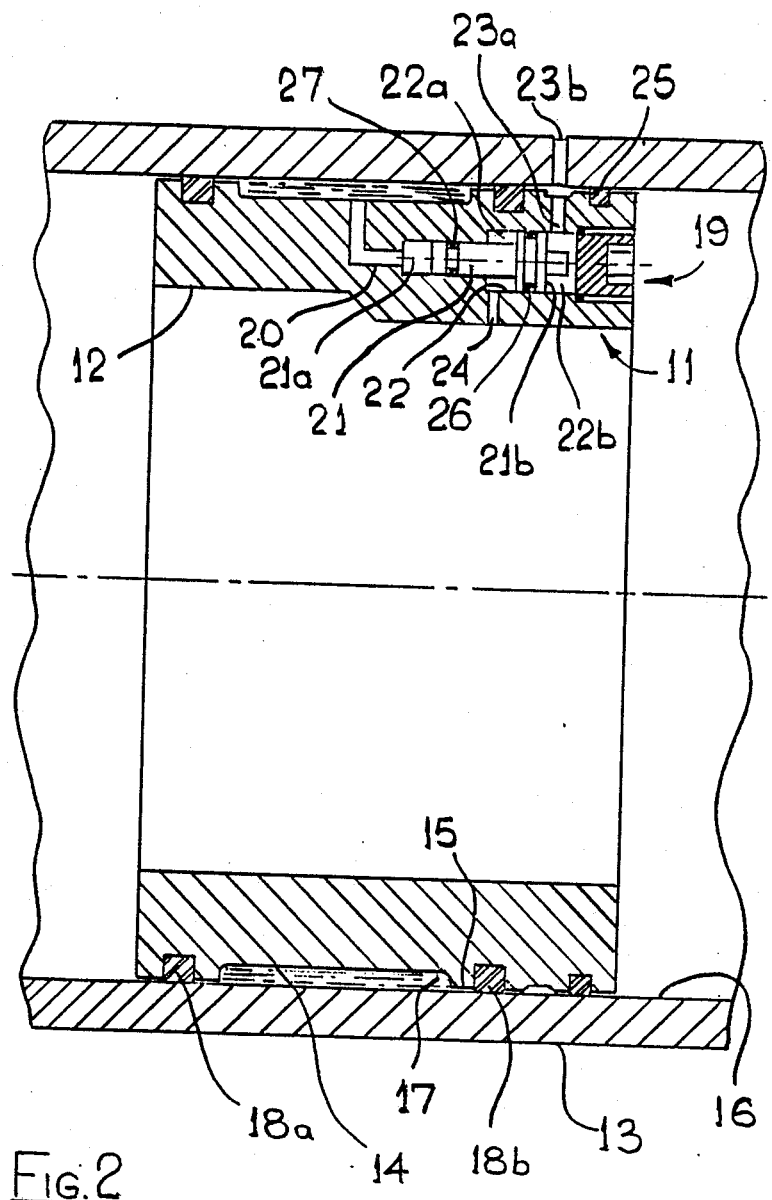
Figure 3:
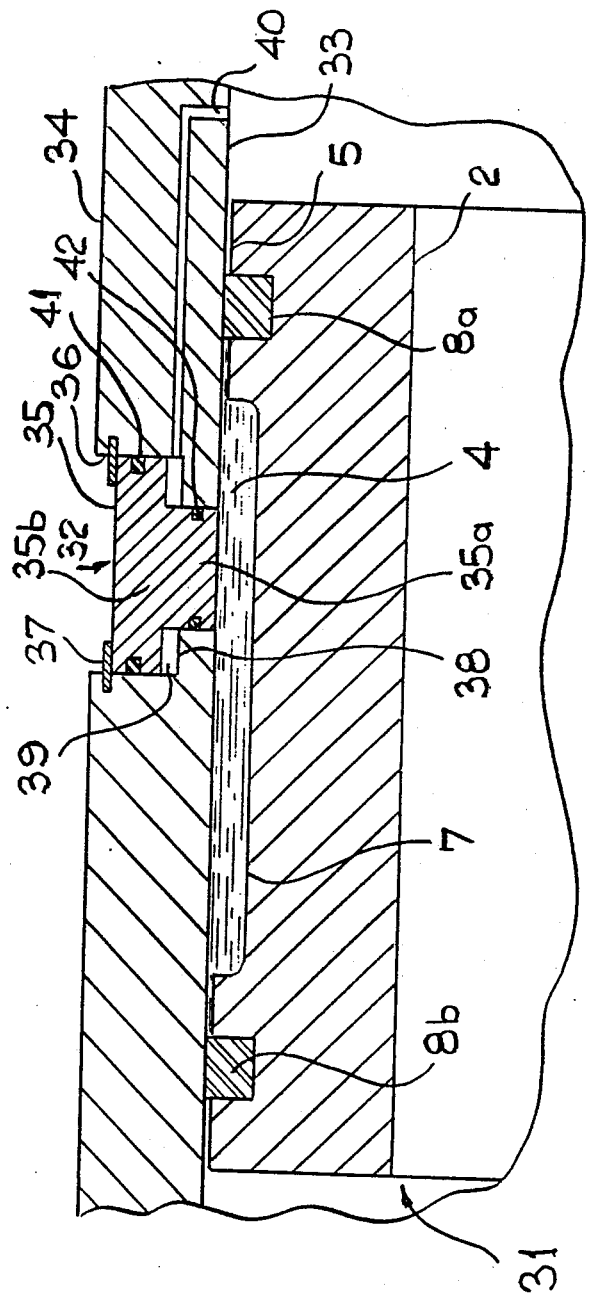

The invention will now be described, by way of three examples, with reference to the accompanying drawings, in which;

FIG. 1 is a sectional view of a first embodiment of the support assembly in use;

FIG. 2 is a sectional view of a second embodiment of the support assembly in use; and FIG. 3 is a sectional view of a third embodiment of the support Referring to FIG. 1 of the drawings, a support assembly 1 in accordance with a first aspect of the invention simply comprises a support member 2 detachably mounted within a vessel 3.

The support member 2 is of such dimensions that a annular recess (chamber) 4 is defined between outer surface 5 of the member and an inner surface 6 of the vessel 3, this recess 4 being filled with a hydraulic oil when the support member is in position. The filling of recess 4 can be achieved by anyone of a number of ways well known in the art. Further the support member 2 has a circumferentially extending groove 7 in its outer surface 5, and is provided with two sealing bands 8a, 8b which are positioned one on either side of the groove.

The recess 4 is therefore defined so that the groove 7 is a constituant thereof.

Now referring to FIG. 2 of the drawings, a support assembly 11 in accordance with a second aspect of the invention comprises a support member 12 detachably mounted within a vessel 13.

The support member 12 is mounted in the vessel so that a recess 14 is defined between outer surface 15 of the member 12 and an inner surface 16 of the vessel 13, the recess being filled in use with a standard type oil.

The support member 12 comprises an annular ring having a circumferential groove 17 in its upper surface 15; two sealing members 18a, 18b positioned on either side of the groove 17 and an intensifier 19 connected to the groove 17 by a channel 20.

The intensifier 19 is formed as part of the support member 12 and comprises a stepped piston 21 which is housed within a correspondingly stepped bore 22; a vent 23a, which is in line with a vent 23b in the vessel 13 and which exposes one side of the piston 21 to external pressure, and sealing means to prevent ingress of pressure into the body of the vessel.

The piston 21 has a high pressure section 21a and a low pressure section 21b, and acts so as to divide the bore 22 into two distinct volumes 22a and 22b. Under loading the volume 22a is maintained at the pressure in the body of the vessel 13 by the action of the vent 24.

The sealing means, in this embodiment of the invention, comprises three seperate members, or sets of members: sealing members 18b, 25 forming a seal between the support member 12 and the vessel 13; sealing member 26 forming a seal between the volumes 22a, 22b and sealing member 27 forming a seal between volume 22a and the channel 20. These seals ensure pressure integrity within the vessel 13 by preventing pressure ingress from the recess 14 or the external pressure source into the body of the vessel. This means the support assembly 11 will be working at maximum efficiency.

Now referring to FIG. 3 of the drawings, a support assembly 31 comprises a support member 2, as previously described with reference to FIG. 1 (which is included herein for reference) and an intensifier 32 which is mounted within the confines of a wall 33 of vessel 34.

The intensifier 32 consists of a piston 35 having a high pressure section 35a and a low pressure section 35b mounted in a bore of corresponding shape so that the high pressure section is in direct contact with the oil in the recess.

The piston 35 is a stepped piston which is held in place by a fixing ring 37, and, which, with a step 38 in the wall 33 define a volume 39.

The volume 39 is maintained at the pressure within the vessel 34 by a duct 40 which equilibralizes the pressure between the volume and the vessel. In order to maintain the integrity of the system there is provided a first sealing member 41 which acts between the low pressure section 35b and the bore 36 at a point above the duct 40 and a second sealing member 42 which acts between the high pressure section 35a and the step 38.

What we claim is:

1. A vessel for resisting an inwardly acting pressure differential, including a support assembly comprising a support member in the form of a rigid annular ring detachably housed within the vessel and having a groove formed in an outer surface thereof which together with the inner surface of the vessel defines an annular enclosed and stationary chamber, said chamber being filled with pressurizing means for pressurizing the chamber when an inwardly acting pressure differential is applied against the exterior of the vessel and defining a non-circulating liquid, said chamber having a seal means which maintains the liquid within said chamber when in use, wherein the inwardly acting pressure differential causes the liquid in said chamber to be pressurized and to exert a back pressure on the vessel wall in the vicinity of said chamber whereby the support assembly supports the vessel from collapse by the inwardly acting pressure differential.

2. A vessel as claimed in claim 1, wherein the support assembly further comprises a pressure intensifier connected between the annular chamber and the exterior of the vessel.

3. A vessel as claimed in claim 2, wherein the intensifier comprises a stepped piston which moves within a stepped bore.

4. A vessel as claimed in claim 1 wherein the vessel is circular in cross section.

5. A vessel as claimed in claim 1, wherein the liquid within the annular chamber is hydraulic oil.

6. A vessel as claimed in claim 1, wherein the sealing means which maintains the liquid within the annular chamber comprises two circumferential sealing members, one on each side of the annular chamber.

7. A vessel as claimed in claim 1, in which the support member is manufactured from a high strength metal.

8. A vessel as claimed in claim 1, in which the support member is manufactured from a high strength metal alloy.

* * * * *